United States Patent [19]

Tsutsui et al.

[11] 4,283,359

[45] Aug. 11, 1981

[54] PROCESS FOR PRODUCING POLYACRYLONITRILE REVERSE OSMOTIC MEMBRANES

[75] Inventors: Nobuhiro Tsutsui; Seiji Takao, both of Okayama; Ichiki Murase, Ibaraki, all of Japan

[73] Assignees: Japan Exlan Company Ltd.; Sumitomo Chemical Company, Ltd., both of Osaka, Japan

[21] Appl. No.: 85,957

[22] Filed: Oct. 18, 1979

[30] Foreign Application Priority Data

Oct. 23, 1978 [JP] Japan ................................. 53-130628
Aug. 21, 1979 [JP] Japan ................................. 54-106763

[51] Int. Cl.$^3$ .......................... B29D 27/04; B29H 7/20
[52] U.S. Cl. ........................................ 264/22; 264/41; 264/80; 264/182; 264/216
[58] Field of Search ................... 264/22, 182, 80, 216, 264/DIG. 47, 41, 49

[56] References Cited

U.S. PATENT DOCUMENTS 3,418,406 12/1968 Ball ..................................... 264/216
4,066,731 1/1978 Hungerford ......................... 264/216
4,147,745 4/1979 Sano et al. ........................... 264/22

Primary Examiner—Donald E. Czaja
Assistant Examiner—W. Thompson
Attorney, Agent, or Firm—Wenderoth, Lind & Ponack

[57] ABSTRACT

A process for producing polyacrylonitrile membranes for use in reverse osmosis, which comprises dissolving an acrylonitrile polymer in formamide (FA)-containing dimethylformamide (DMF) to prepare an acrylonitrile polymer solution for membrane formation; shaping the solution into a membranous product of a desired form while maintaining the temperature of the solution within a specific range; removing the solvent from the membranous product under a specified solvent removal condition (solidifying condition); subjecting the thus-obtained membrane to a heat treatment, and further to a plasma treatment. The polyacrylonitrile membrane thus obtained is asymmetric and porous in structure, and excellent both in separation ability and in mechanical strength. This membrane is very suitable for use in reverse osmosis.

18 Claims, No Drawings

PROCESS FOR PRODUCING POLYACRYLONITRILE REVERSE OSMOTIC MEMBRANES

BACKGROUND OF THE INVENTION

1. Field of the Invention

The present invention relates to a process for producing a polyacrylonitrile membrane for use in reverse osmosis, and more specifically to a process which comprises preparing a membrane-forming solution of an acrylonitrile polymer dissolved in formamide (FA)-containing dimethylformamide (DMF); forming the polymer solution into a membranous product while maintaining the temperature of the polymer solution within a specified range; removing the solvent under a specified solvent removal condition (solidifying condition); subjecting the thus-obtained solidified membrane to a heat treatment and further to a plasma treatment, whereby a polyacrylonitrile reverse osmotic membrane is obtained which is excellent both in membranous separation ability and in mechanical strength, and is asymmetric and porous in structure.

2. Description of the Prior Art

In recent years, in the wide field of applications including waste water treatment, desalination of sea water, food industry, medical treatment, etc., separation methods for various substances using semi-permeable membranes are given attention and are expected for their further development.

As such membranous separation methods, there have been proposed various techniques such as ultrafiltration, reverse osmosis, etc. depending on the particle size of the substance which is suspended, dispersed or dissolved in the aqueous medium to be treated. It goes without saying that the properties required for the membrane should be different depending on the respective objects of separation, but the properties commonly required for them are a high permeation rate of the aqueous medium, an excellent ability for rejection molecules having a particular molecular weight, a sufficient mechanical strength and chemical resistance.

Although separation membranes produced from acrylonitrile polymers are said to have excellent properties as materials for separation membranes, the membranes that have been put into practical use at present are only those for use in the separation of macromolecules, namely those in the field of ultrafiltration, microfiltration or dialysis, and they are scarcely applied to the field of reverse osmosis for separating low molecular substances such as sodium chloride. This is considered to result from the fact that, although acrylonitrile polymer membranes have a sufficient water permeability and salt rejection ability, it is difficult for them to form a membrane structure, especially a skin layer, having a sufficient strength to withstand the severe separating operation in reverse osmosis. That is to say, although it is indispensable to form such a skin layer in order to obtain a reverse osmotic membrane having a sufficient water permeability and salt rejection ability, it has not been successful up to this time to find a technical means to produce a membrane having such a skin layer in an industrially advantageous manner.

STATEMENT OF THE INVENTION

In such a situation, we have researched intensively to overcome the above-mentioned difficulty and to produce polyacrylonitrile porous membranes having an excellent ability for use in reverse osmosis. As a result, we have found that, by using FA-containing DMF as the solvent for AN polymers, specifying the temperature of the AN polymer solution for membrane formation and the solvent removal condition, and further subjecting the polyacrylonitrile porous membrane to a plasma treatment, it is possible to produce polyacrylonitrile reverse osmotic membranes which are excellent in mechanical strength and asymmetric in structure and which have a suitable range of permeation rate and salt rejection ability. Furthermore, as a result of studying a wide range of solvent removal conditions which will enable us to obtain an excellent reverse osmotic ability, we have found that, in producing a polyacrylonitrile porous membrane (membrane to be treated with plasma), it is possible to produce a polyacrylonitrile asymmetric membrane having a satisfactory aqueous medium-permeating rate and salt rejection ability by employing a suitable range of contact length of an inert atmosphere, even if the concentration of the solvent removal treatment medium $A_2$ (which will be explained later) is relatively low. These findings led us to the present invention.

Therefore, an object of the present invention is to provide a process for producing polyacrylonitrile membranes for use in reverse osmosis which are asymmetric in structure and whose permeating rate and salt rejection ability can be adjusted to a suitable range.

Another object of the present invention is to provide an industrially advantageous process for producing polyacrylonitrile porous membranes excellent in mechanical strength and in which process the recovery and refining of the solvent is easy.

A further object of the present invention is to provide a process for producing polyacrylonitrile reverse osmotic membranes whose separation abilities can be designed.

The above-mentioned objects of the present invention can be attained by a process comprising the steps of dissolving an AN polymer in FA-containing DMF to prepare an AN polymer solution for membrane formation; shaping the solution into a membranous product of a desired form while maintaining the temperature of the solution above its gellation temperature; removing the solvent from the membranous product by bringing one side of the membranous product into contact with an aqueous solution (solvent removal treatment medium $A_1$) of a temperature lower than 15° C. containing at least 10 weight % of a water-soluble solvent compatible with the above-mentioned mixed solvent, immediately or after bringing it once into contact with an inert atmosphere, and by bringing the other side of the membranous product into contact with an inert medium or an aqueous solution (solvent removal treatment medium B) of a temperature higher than 0° C. containing not more than 50 weight % (inclusive of 0%) of an water-soluble solvent compatible with the above-mentioned mixed solvent, immediately or after bringing it once into contact with an inert atmosphere; subjecting the thus-obtained solidified membrane to a heat treatment at a temperature between 50° and 120° C.; and then subjecting the membrane to a plasma treatment (hereinafter referred to as Process I).

The above-mentioned objects of the present invention can be also attained by a process comprising the steps of dissolving an AN polymer in FA-containing DMF to prepare an AN polymer solution for membrane formation; shaping the solution into a membranous product of a desired form while maintaining the temperature of the solution at a temperature above its gellation temperature; removing the solvent from the membranous product by bringing one side of the membranous product into contact with an inert atmosphere, followed by bringing it into contact with an aqueous solution (solvent removal treatment medium $A_2$) of a temperature lower than 40° C. containing not more than 10 weight % (inclusive of 0%) of a water-soluble solvent compatible with said mixed solvent, and by bringing the other side of the membranous product into contact with an inert medium or an aqueous solution of a temperature higher than 0° C. containing not more than 50 weight % (inclusive of 0%) of a water-soluble solvent compatible with said mixed solvent, immediately or after bringing it once into contact with an inert atmosphere; subjecting the thus-obtained solidified membrane to a heat treatment at a temperature between 50° and 120° C.; and then subjecting the membrane to a plasma treatment (hereinafter referred to as Process II).

By employing the production Process I, the separation-active layer (the layer with which the solution of the substance to be separated comes directly into contact) of the liquid membranous product shaped into a desired form from the AN polymer solution which is in a sol state, can form a smooth, dense structure because a sol-to-gel conversion takes place owing to a decrease in the temperature after shaping, in connection to some extent with the selection of the composition and temperature of the AN polymer solution. That is to say, because of a decrease in the temperature, the AN polymer agglomerates to some degree to pass over a mobility-decreased state (sol-to-gel conversion), and during this conversion, the solvent removal arises, so that the formation of a dense structure becomes easy. On the other hand, at the supporting layer side of the membrane (the layer side lying opposite to the active layer), solidification occurs as a result of the solvent removal treatment, so that a fixed, solid structure is formed. Furthermore, this solvent removal phenomenon proceeds from the active layer to the layer portion lying opposite thereto, and the pore size of the porous structure, as seen in a cross-section of the membrane, is characterized by a gradient in which the pore size is smaller in the active layer and larger in the supporting layer. (Because the solidification by the action of the solvent removal agent is preferential to the gellation due to the sol-to-gel conversion which proceeds from the active layer towards the supporting layer owing to the temperature drop, the solidification by the action of the solvent removal agent becomes more predominant gradually towards the supporting layer, so that the polymer precipitates in a coarser structure in the supporting layer. Of course, this precipitation behavior is also dependent to some extent on the selection of the composition and temperature of the AN polymer solution.) In this way, since both sides of the membrane gel or solidify in different mechanisms, the membrane has a peculiar pore distribution, and in actual practice, this increases the treating capacity in the separating operation. The solvent removal is done by giving a difference between the concentrations of the coagulant in the coagulating solution coming into contact with the two sides of the membrane and/or a difference between the temperatures of the coagulating baths. But by specifying the condition of the solvent removal treatment as in Process I, the gellation or solidification at both sides of the above-mentioned membrane proceeds more effectively, namely the pores formed at the active layer side and the supporting layer side can be arranged according to the above-mentioned peculiar size distribution (gradient). Consequently, it has now become possible to obtain polyacrylonitrile separation membranes improved in membrane properties, such as permeation rate, salt rejection ability, mechanical strength, etc. One important point in Process I of the present invention is, of course, to subject the thus-produced polyacrylonitrile porous membrane to a plasma treatment. By this plasma treatment, a cross-linked structure uniform to the order of a molecular size (a skin layer having fine pores sufficient strong to withstand the membranous separating operation by reverse osmosis) is formed in the separation-active layer. This structure provides the membrane with a necessary and sufficient salt rejection ability and reduces the loss of the water permeation ability to a minimum. Thus, it has now become possible to obtain a polyacrylonitrile reverse osmotic membrane having a membrane structure which can exhibit an excellent reverse osmotic ability.

Also, by employing Process II (preferably by combining a suitable contact length of an inert atmosphere and a suitable concentration of solvent removal treatment medium $A_2$, as previously mentioned), the pore size in the porous structure of the precursor membrane thus obtained becomes to have a gradient in which the pore size is smaller towards the separation-active layer (the layer portion with which the solution of a substance to be separated comes directly into contact) and larger towards the supporting layer (the layer portion lying opposite to the active layer). Thus, it has now become possible to obtain polyacrylonitrile porous membranes having excellent membranous properties, such as water permeation rate, salt rejection ability, mechanical strength, etc. One key point also important in Process II is, of course, to subject the thus-produced polyacrylonitrile porous membrane to a plasma treatment, as in the above-mentioned Process I. By this plasma treatment, a cross-linked structure uniform to the order of a molecular size (a skin layer having fine pores sufficiently strong to withstand the membranous separating operation by reverse osmosis) is formed in the above-mentioned separation-active layer. This structure provides the membrane with a necessary and sufficient salt rejection ability and reduces the loss of the water permeation ability to a minimum. Thus, it has now become possible to obtain a polyacrylonitrile reverse osmotic membrane having a membranous structure which can exhibit an excellent reverse osmotic ability.

DESCRIPTION OF PREFERRED EMBODIMENTS

The acrylonitrile polymers used as the starting material of the reverse osmotic membrane of the present invention (Process I and Process II) are those obtained by known methods. Such polymers are preferably polymers of AN alone or polymers containing combined therewith more than 80 weight % of acrylonitrile units. In case the AN content is less than 80%, the chemical resistance, affinity to water and resistance to heat of the membrane obtained will be insufficient, so that such AN polymers are not desirable. It is preferable to use an AN polymer having a molecular weight represented by the limiting viscosity $[\eta]$ measured in DMF at 30° C. falling within the range of from 0.4 to 4. If the molecular weight is too small, the membrane-forming properties, mechanical strength and resistance to water will be poor, and too large a molecular weight will also give poor membrane-forming properties. As monomers to be copolymerized with AN, any known comonomers copolymerizable with AN can be used. They include, for example, conjugated diene monomers such as butadiene, isoprene, etc.; aromatic vinyl monomers such as styrene, α-methylstyrene, chlorostyrene, etc.; nitrile monomers such as methacrylonitrile, vinylidene cyanide, etc.; acrylic acid esters such as methyl acrylate, ethyl acrylate, butyl acrylate, etc.; methacrylic acid esters such as methyl methacrylate, ethyl methacrylate, butyl methacrylate, etc.; vinyl halides and vinylidene halides such as vinyl chloride, vinyl bromide, vinylidene chloride, vinylidene bromide, etc.; vinyl esters such as vinyl acetate, vinyl propionate, etc.; and ethers such as ethyl vinyl ether, butyl vinyl ether, etc.

First of all in the production of the membrane according to the present invention, an AN polymer as mentioned above is dissolved in a solvent to prepare a solution for membrane formation. As the solvents to be used in the present invention (Process I and Process II), it is indispensable to use FA-containing DMF. Although the mixing ratio of FA and DMF is determined in relation to the composition and molecular weight of the AN polymer, the polymer concentration in the solution of membrane formation, and the temperature of the solution, etc., it is preferable to select a mixing ratio from the range of about 1/99 to 28/72, from the viewpoint of the properties (mechanical strength, water permeation rate, and salt rejection ability) of the finally obtained membrane. It is also possible, if necessary, to add to the FA-DMF mixed solvent one or more other additives which are compatible with said mixed solvent, for example water, dioxane, dimethyl sulfoxide, dimethylacetamide, acetone, ethylene carbonate, organic fatty acids, alcohols, glycols or inorganic salts. The ratio of these additives to be added should be less than 5%, based on the total weight of the FA-DMF mixed solvent.

In Process I, the AN polymer concentration in the solution for membrane formation should be maintained within the range of from 10 to 35 weight %, preferably from 20 to 32 weight %, based on the total weight of the solution. Too low or too high polymer concentrations are not desirable because such concentrations will give poor membrane-forming properties.

The AN polymer concentration in the solution for membrane formation in Process II should be maintained within the range of from 15 to 40 weight %, preferably 20 to 35 weight %, based on the total weight of the solution. Too low or too high polymer concentrations are not desirable because such concentrations give poor membrane-forming properties.

A certain difference existing in the suitable range of the AN polymer concentrations for Process I and Process II is due to the difference in the solvent removal conditions.

The AN polymer solution for membrane formation in Process I and Process II comprising an AN polymer, mixed solvent and additive(s) added as required, is dissolved and deairated. The dissolution can be carried out by any method (for example, when stirring under heat is employed, the dissolution is carried out for 1 to 3 hours at about 60° to 80° C. for Process I, and at about 60° to 100° C. for Process II). In every case, it must be avoided to employ a temperature lower than the gellation temperature which will be explained later.

In the next place, the thus-prepared solution for membrane formation, while being maintained at a temperature above the gellation temperature, is shaped into a membranous product such as flat film, tube, hollow fiber, etc. by spreading the solution over a flat plate, endless belt, rotary drum, etc. or by extruding the solution through a spinnerette orifice in the form of a slit or a ring. This procedure is common to Process I and Process II. If the temperature of the solution for membrane formation is less than the gellation temperature, the whole gellation proceeds in the direction of the thickness of the membrane, so that it will be difficult to form asymmetry in the membrane structure and to form a dense, thin layer having separation activities. The preferable temperature range of the solution for membrane formation is comprised between temperatures which are by 1° to 50° C. higher than the gellation temperature of the solution. The term "gellation temperature" used in the present invention (commonly to Process I and Process II) will be explained in the following:

An about 150 to 180 g quantity of a sample solution is poured into a beaker which is about 5.5 cm in diameter and about 11 cm in height. This beaker is dipped into a temperature-controllable water bath maintained previously at the same temperature level as the dissolution temperature. The temperature of the solution is then lowered at the rate of about 10° C./hour, accompanied with the temperature lowering of the water bath. At given time-points during this temperature lowering, a glass rod (available from the market) which is 3 mm in outer diameter and 2.5 g in weight, is placed vertically on the surface of the solution, while being supported lightly at its upper portion by a ring-shaped holder. The glass rod penetrates into the solution under the action of its own weight, and sinks. The time elapsed until a sinking length of 5 cm is attained, is measured. When the logarithms of the required sinking times thus measured are plotted on the ordinate and the reciprocals of the solution temperatures of the corresponding times are plotted on the abscissa, two straight lines having different gradients, namely having a bending point, are obtained. The temperature of the bending point read from the abscissa axis is defined as the gellation temperature. Such a gellation temperature is always inherently present in any solution for membrane formation composed of an AN polymer, mixed solvent, etc. Some examples of gellation temperatures which we measured are shown in Table 1 below. The AN polymer used in this measurement of gellation temperatures was an AN/vinyl acetate (88/12) copolymer having a limiting viscosity of 0.97.

TABLE 1

| AN copolymer conc. (%) | DMF (%) | FA (%) | Others (%) | Gellation temperature (°C.) |
|---|---|---|---|---|
| 30 | 60 | 10 | — | 75 |
| 25 | 74 | 1 | — | 45 |
| 25 | 68 | 7 | — | 60 |
| 20 | 75 | 5 | — | <20 |
| 20 | 72 | 8 | — | 50 |
| 20 | 70 | 10 | — | 55 |
| 15 | 75 | 10 | — | <20 |
| 15 | 73 | 12 | — | 42 |
| 10 | 75 | 15 | — | <20 |
| 10 | 73 | 17 | — | 35 |
| 25 | 68 | 5 | Water 2 | 70 |
| 25 | 68 | 5 | Methanol 2 | 55 |

TABLE 1-continued

| AN copolymer conc. (%) | DMF (%) | FA (%) | Others (%) | Gellation temperature (°C.) |
|---|---|---|---|---|
| 25 | 68 | 5 | Dioxane 2 | 55 |
| 25 | 68 | 5 | DMSO 2 | 45 |

DMSO = Dimethyl sulfoxide (a) Solvent Removal Treatment in Process I

In the practice of Process I, the thus-formed sol membrane is then subjected to a solvent removal treatment, immediately or after being caused to pass through an inert atmosphere. It is indispensable for the condition of the solvent removal treatment in Process I to bring one side of the membrane in a sol state into contact with an aqueous solution (solvent removal treatment medium $A_1$ having relation to the formation of the above-mentioned separation-active layer) of a temperature lower than 15° C. containing at least 10 weight % of a water-soluble solvent compatible with the above-mentioned mixed solvent, immediatly or after bringing it once into contact with an inert atmosphere, and to bring the other side of the membrane into contact with an inert medium or an aqueous solution (solvent removal treatment medium B having relation to the formation of the above-mentioned supporting layer) of a temperature higher than 0° C., preferably lower than 80° C., containing not more than 50 weight % of a water-soluble solvent compatible with the above-mentioned mixed solvent, immediately or after bringing it once into contact with an inert atmosphere. Any of these steps of the solvent removal treatment is lacking, it is difficult to expect the production of a separation membrane which ensures well-balanced membrane properties, such as water-permeation rate, salt rejection ability, etc. Concreate embodiments of the solvent removal treatment in Process I will be explained in the following with respect to hollow fiber-shaped membranes and flat membranes. In the case of the hollow fiber-shaped membrane, the hollow portion of the membrane is immediately brought into contact with the above-mentioned solvent removal treatment medium B by employing a suitable spinnerette, and on the other hand the surface layer of the membrane is brought into contact with the solvent removal treatment medium $A_1$ (outer bath) which surrounds the surface layer, immediately or after being brought into contact with an inert atmosphere. In the case of flat membranes, the two surfaces of the membrane formed by employing a spinnerette having a suitable slit so as to separate said two surfaces, are brought into contact respectively with the medium $A_1$ and the medium B surrounding the respective surfaces, immediately or after both surfaces have been once brought into contact with an inert atmosphere. In the case of hollow fiber-shaped membranes, the supply rate of the medium B to be introduced into the hollow portion is not particularly limited, but from the viewpoint of improving the properties of the final membrane, it is desirable to employ a quantity in the range of from the same to about 1/50 as much as the supply quantity of the solution for membrane formation. The above-mentioned water-soluble solvents and inert media used in Process I include, for example, dimethylacetamide, dimethyl sulfoxide, DMF, γ-butyrolactone, ethylene glycol, nitric acid and inorganic salts, as a single compound or as a mixture; and air, nitrogen, flat plates, etc. Among these inert atmospheres, air and nitrogen are generally used.

The best way of use of the $A_1$ and B media as well as the inert atmosphere is that the $A_1$ medium contains more than 20 weight % of the water-soluble solvent and is used at a temperature below 10° C.; that the B medium contains less than 50 weight % of the water-soluble solvent and is used at a temperature above 10° C.; and that the inert atmosphere is used at a temperature between room temperature and 150° C.

Whether the sol membrane shaped into a desired form should be subjected to solvent removal treatment immediately or after contanct with an inert atmosphere, should be suitably decided, taking account of the practical use of the finally obtained membrane.

The length of the inert atmosphere in Process I is not particularly limited.

(b) Solvent Removal Treatment in Process II

In the practice of Process II, the thus-formed sol membrane is then subjected to a solvent removal treatment by causing it to pass through an inert atmosphere. It is indispensable for the condition of the solvent removal treatment in Process II to bring one side of the membrane in a sol state into contact with an inert atmosphere and then into contact with an aqueous solution (solvent removal treatment medium $A_2$ having relation to the formation of the above-mentioned separation-active layer) of a temperature lower than 40° C. containing not more than 10 weight % (inclusive of 0%, namely pure water) of a water-soluble solvent compatible with said mixed solvent, and to bring the other side of the membrane into contact with an inert medium or an aqueous solution (solvent removal treatment medium B having relation to the formation of the above-mentioned supporting layer) of a temperature higher than 0° C., preferably lower than 80° C., containing not more than 50 weight % (inclusive of 0%, namely pure water) of a water-soluble solvent compatible with said mixed solvent, immediately or after bringing it into contact with an inert atmosphere. Any of these steps of the solvent removal treatment is lacking, it will be difficult to expect the production of a separation membrane which ensures well-balanced membrane properties such as water permeation rate, salt rejection ability, etc. As for the concentration of the medium $A_2$, when the polyacrylonitrile porous membrane is used without subjecting it to a further processing (for example when used for ultrafiltration), it is essential to maintain the concentration less than 20 weight %, but when it is used as a reverse osmotic membrane after plasma treatment, it is necessary to select the concentration from the range of less than 10 weight %.

A preferred embodiment of Process II of the present invention upon performing the solvent removal treatment is to specify the contact length of the sol membrane with the inert atmosphere. The contact length with the inert atmosphere is selected from the 3 to 160 mm range. By employing such a contact length, even if the concentration of the medium $A_2$ is relatively low, it is possible to produce a polyacrylonitrile porous membrane having an asymmetric structure as mentioned above. However, if too long a contact length (for example 185 mm) is used at such a low concentration, there is obtained only a polyacrylonitrile membrane having ill-balanced membrane properties, for example a membrane having a satisfactory water permeation rate but a relatively poor salt rejection ability. The following Table 2 briefly shows the influence of contact length with the inert atmosphere and medium $A_2$ concentration on the properties of membranes for use in reverse osmosis.

TABLE 2

| Sample no. | | Contact length (mm) | Medium $A_2$ concentration (%) | Properties of membranes (for use in reverse osmosis) | |
|---|---|---|---|---|---|
| | | | | Water permeation rate (F)* | Percent salt rejection R* |
| A | (comparative example) | 185 | 7 | $2.4 \times 10^{-2}$ | 36.7 |
| B | (present invention) | 35 | 7 | $7.8 \times 10^{-3}$ | 95.8 |

*The measurement method for F and R will be mentioned later.

The above-mentioned water-soluble solvents and inert media used in Process II of the present invention include, commonly to Process I, dimethylacetamide, dimethyl sulfoxide, DMF, γ-butyrolactone, ethylene glycol, nitric acid, inorganic salts, as a single compound or as a mixture; and air, nitrogen, flat plates, etc. It is also common to Process I and Process II to use air and nitrogen usually as the inert atmosphere.

It is essential that the temperature of the medium $A_1$ and medium $A_2$ in Process I and Process II should be lower than 15° C. and 40° C., respectively. This difference comes from the fact that, since, in Process II, due to combined use of the particular inert atmosphere contact length and the lower (lower than in the Process I) concentration of the water-soluble solvent in the solvent removal treatment medium $A_2$, a wider (wider than Process I) temperature range can be used for the medium $A_2$.

The solidified membrane produced through the solvent removal treatment of Process I or Process II is then subjected to water-washing, stretching and then to heat treatment. Preferably, this stretching should be carried out so that the membrane is stretched 0.8 to 1.5 times in length, based on the size of the solidified membrane, monoaxially or biaxially, at a temperature above 50° C., preferably above 80° C. The heat treatment is carried out in a bath containing water and/or polyethylene glycol or glycerine, at a temperature between 50° and 120° C., preferably between 80° and 100° C. If the heat treatment temperature is less than 50° C., it is impossible to expect a sufficient improving effect in hot water resistance due to the structure fixation of the polymer, resistance to pressure, reusability after drying, and salt rejection ratio. On the other hand, when the temperature exceeds 120° C., the water permeation rate will be lowered.

The solidified membrane (material for reverse osmotic membrane) thus obtained by Process I or Process II is then subjected to a plasma treatment. The plasma treatment is effected to the surface which will become the separation-active layer. The term "plasma" as used herein includes all plasmas produced by glow discharge, corona discharge or by any other means. As the gases to form such plasmas, there can be used inorganic gases such as helium, argon, nitrogen, hydrogen, oxygen, carbon dioxide, ammonia, etc.; hydrocarbons having 1 to 10 carbon atoms such as methane, ethane, propane, ethylene, propylene, acetylene, etc.; epoxide compounds having 2 to 10 carbon atoms, such as ethylene oxide, propylene oxide, isobutylene oxide, etc.; alkyl amines such as dimethylamine, triethylamine, etc. As for the mode of practice of such plasma treatment, the methods described in Japanese Kokai (Laid-open) Patent Application Nos. 29383/1976 and 26380/1977 can be wholly used.

As previously mentioned, in producing a polyacrylonitrile asymmetric reverse osmotic membrane, when the process of the present invention is employed wherein a solution of an AN polymer in FA-containing DMF is shaped and solidified into a membrane under said particular condition and the membrane is further heat-treated and plasma-treated, there can be obtained a polyacrylonitrile asymmetric membrane having a high separation ability and resistance to pressure, of which the separation-active portion and supporting portion are formed by different mechanisms and of which the separation-active surface is smooth and cross-linked uniformly to the order of a molecular size.

Furthermore, by following the process of the present invention, there is an advantage that the pore size of the membrane can be easily controlled on the basis of its principle of the solvent removing mechanism, so that various kinds of reverse osmotic membranes can be produced in conformity with the purposes and properties required.

For a better understanding of the present invention, representative examples of the invention are shown in the following, but it is to be understood that the present invention is not limited for its scope by these examples, in which all percentages and parts are by weight unless otherwise indicated.

The water permeation rate and percent salt rejection (%) were measured or calculated respectively by the following methods:

(1) Water Permeation Rate F ($m^3/m^2$.day. $kg/cm^2$)

A 0.5% NaCl aqueous solution was used as the test solution. A test specimen (prepared in such a way that several membranes in the form of hollow fibers were bundled into a loop and about 5 cm portion from one end opposite to the loop was hardened with an epoxy resin) was placed in a pressure filtration apparatus, and the test solution was put to the outer side of the test specimen. A pressure difference of 50 $kg/cm^2$ was set up between the test solution side and the side to which the solution is to be permeated (the permeated liquid flows out of the hollow portion of the hollow fibers), and the amount of the permeated liquid was measured. From this measurement, the water permeation rate F per unit membrane area per unit time per unit pressure (unit differential pressure) was calculated. The greater the water permeation rate (F), the better the efficiency of the reverse osmotic membrane.

(2) Percent salt rejection R (%) was calculated from the following general formula (I):

$$R = (1 - C/C_o) \times 100 \qquad (I)$$

wherein $C_o$ represents the concentration of NaCl in the above-mentioned test solution, and C represents the concentration of NaCl in the permeated liquid at the time-point at which 5% of the amount of the test solution has been permeated. The greater the value R, the greater is the salt rejection ability.

(A) EXAMPLES IN THE CASE OF PROCESS I

Example 1

Twenty five (25) parts of an AN polymer (having a limiting viscosity [η] of 0.97 as measured in DMF at 30°

C.) containing combined therewith 88% AN and 12% vinyl acetate was dissolved in 75 parts of each of the mixed solvents shown in Table 3, respectively, and the solutions were deairated to prepare solutions for membrane formation. (The gellation temperatures of the respective solutions are also shown in Table 3.) Each solution, while being maintained at a temperature of 65° C., was spun through a sheath-core type spinnerette into air through which it was caused to travel for a length of 185 mm, and was introduced into a 40% aqueous DMF solution (4° C.) to subject it to a solvent removal treatment. During this spinning process, a 10% aqueous DMF solution at 20° C. was introduced into the core portion. (The supply rate of the DMF solution was maintained at 1/25 of that of the solution for membrane formation. The solidified hollow fiber-shaped membrane was continuously withdrawn out of the bath, washed with water, treated with hot water while being maintained at a stretching ratio of 1.05 times, and dried. The thus-obtained solidified membrane was put into a vacuum vessel, and helium gas was introduced therein and was controlled to maintain a pressure of 0.2 Torr. Thereafter, an AC voltage of 3.0 kilovolts was impressed between electrodes to subject the outer surface of the hollow fiber-shaped membrane to plasma treatment for 20 minutes.

The membrane properties of the polyacrylonitrile reverse osmotic membranes thus obtained (No. 1 to No. 7) were evaluated. The results are shown in Table 3. The membrane properties obtained when the membrane formation temperature was maintained at 62° C. are also shown in Table 3 as No. 8. As a comparative example (No. 9), the membrane properties obtained when the membrane formation temperature (55° C.) was lower than the gellation temperature are also shown in Table 3.

As apparent from the results in Table 3, it is understood that the hollow fiber-shaped membranes (No. 1, Nos. 5-8) produced satisfying the conditions for the mixed solvent composition and solution temperature recommended in the present invention are remarkably improved in their membrane properties. On the other hand, the membranes (Nos. 2, 3 and 4) produced using a solvent containing no FA and the membrane (No. 9) whose solution for membrane formation was set at a temperature lower than its gellation temperature, were not satisfactory both in water permeation rate and in salt rejection ability, so that they were not suitable for practical use. The reverse osmotic membranes of No. 1 and Nos. 5-8 were excellent in resistance to water, mechanical strength and in chemical resistance. The membrane which was not subjected to plasma treatment (Sample No. 1 membrane, however without plasma treatment) had a percent salt rejection R of only 1.3% and therefore could not be used as a reverse osmotic membrane. A hollow-fiber shaped membrane after removal from the bath was directly dried at room temperature and plasma-treated, without being subjected to hot water treatment. The percent salt rejection R of this membrane was found to be only 11.6%, and therefore this membrane could not also be used for reverse osmosis.

TABLE 3

| Sample no. | Mixed Solvent composition (%) DMF | FA | Others | Gellation Temperature (°C.) | Temperature of solution for membrane formation (°C.) | Membrane properties Water permeation rate, F | Percent salt rejection, R (%) | Remarks |
|---|---|---|---|---|---|---|---|---|
| 1 | 68 | 7 | — | 60 | 65 | $5.0 \times 10^{-3}$ | 97.2 | Present invention |
| 2 | 68 | — | DMSO 7 | <20 | 65 | $7.4 \times 10^{-4}$ | 19.0 | Comparative example |
| 3 | 68 | — | DMA 7 | <20 | 65 | $4.8 \times 10^{-4}$ | 21.1 | Comparative example |
| 4 | 75 | — | — | <20 | 65 | $3.4 \times 10^{-4}$ | 28.6 | Comparative example |
| 5 | 68 | 5 | DMSO 2 | 45 | 65 | $1.3 \times 10^{-2}$ | 92.6 | Present invention |
| 6 | 68 | 5 | DMA 2 | 47 | 65 | $1.2 \times 10^{-2}$ | 91.3 | Present invention |
| 7 | 68 | 5 | CH$_3$OH 2 | 55 | 65 | $3.2 \times 10^{-3}$ | 98.2 | Present invention |
| 8 | 68 | 7 | — | 60 | 62 | $1.7 \times 10^{-2}$ | 90.4 | Present invention |
| 9 | 68 | 7 | — | 60 | 55 | $1.1 \times 10^{-2}$ | 18.7 | Comparative example |

Example 2

A polyacrylonitrile reverse osmotic membrane (No. 10) was produced in the same way as in No. 1 of Example 1, except that the solution for membrane formation was immediately subjected to solvent removal treatment without passing through air. The properties of the membrane thus produced were as follows:

| Water permeation rate: | $6.8 \times 10^{-3}$ |
|---|---|
| Percent salt rejection R (%): | 96.6% |

From the above results, it is understood that, in both cases wherein the sol membrane is once caused to pass through air or is immediately led into the solvent removal treatment bath, membranes having well-balanced properties can be obtained, so far as the process of the present invention is employed. The reverse osmotic membrane of Sample No. 10 was also excellent in resistance to water.

Example 3

Polyacrylonitrile reverse osmotic membranes (Nos. 11-14) were produced in the same way as in Sample No. 1 of Example 1, except that the solvent removal conditions in the outer bath (the selection of the above-mentioned solvent removal treatment medium A$_1$) of the hollow fiber-shaped membranes were varied as shown in Table 4, in which the properties of these membranes are also shown.

TABLE 4

| Sample no. | Membrane forming conditions (outer bath) Concentration of water-soluble solvent (%) | Temperature (°C.) | Membrane properties Water permeation rate, F | Percent salt rejection, R |
|---|---|---|---|---|
| 11* | 40 | 15 | $8.0 \times 10^{-3}$ | 94.3 |
| 12** | 40 | 18 | $1.6 \times 10^{-2}$ | 31.2 |
| 13* | 10 | 15 | $1.1 \times 10^{-2}$ | 89.0 |
| 14** | 7 | 15 | $2.4 \times 10^{-2}$ | 36.7 |

*Present invention
**Comparative example

As apparent from Table 4, it is understood that the hollow fiber-shaped membranes (Sample No. 11 and No. 13) produced by employing the conditions for solvent removal treatment of the present invention were improved in their membrane properties.

EXAMPLE 4

Polyacrylonitrile reverse osmotic membranes (Sample Nos. 15-20) were produced in the same way as in Sample No. 1 of Example 1, except that the conditions for the solvent removal of the medium introduced into the hollow portion of the hollow fiber-shaped membranes (the selection of the solvent removal treatment medium B) were varied as shown in Table 5, in which the properties of the membranes thus obtained are also shown.

TABLE 5

| | Membrane forming conditions (hollow portion) | | Membrane properties | |
|---|---|---|---|---|
| Sample no. | Concentration of water-soluble solvent (%) | Temperature (°C.) | Water permeation rate, F | Percent salt rejection, R |
| 15* | 10 | 10 | $4.4 \times 10^{-3}$ | 98 |
| 16* | 10 | 0 | $3.0 \times 10^{-3}$ | 98.6 |
| 17** | 10 | −3 | $8.0 \times 10^{-4}$ | 99.2 |
| 18* | 30 | 20 | $4.3 \times 10^{-3}$ | 97.7 |
| 19* | 50 | 20 | $3.3 \times 10^{-3}$ | 98.8 |
| 20** | 55 | 20 | $5.1 \times 10^{-4}$ | 99.5 |

*Present invention
**Comparative example

From the results in Table 5, it is understood that the hollow fiber-shaped membranes (Sample nos. 15, 16, 18, 19) produced by employing the conditions of the solvent removal treatment according to the present invention were improved in their membrane properties. The reverse osmotic membranes (Sample Nos. 15, 16, 18, 19) were satisfactory both in resistance to water and in mechanical strength.

EXAMPLE 5

A polyacrylonitrile reverse osmotic membrane (No. 21) was produced in the same way as in Sample No. 1 of Example 1, except that air (inert medium) was introduced into the hollow portion of the hollow-fiber-shaped membrane. The supply of air was maintained at an amount which does not bring about a remarkable ballooned state like Barus effect. The properties of the membrane thus obtained were as follows:

| Water permeation rate: | $2.1 \times 10^{-3}$ |
|---|---|
| Percent salt rejection: | 99.1% |

It is understood therefore that the reverse osmotic membrane produced by introducing an inert medium into the hollow portion according to the method the present invention has a well-balanced membrane properties.

EXAMPLE 6

The solution for membrane formation employed in Example 1 (corresponding to No. 6), while being maintained at a temperature of 65° C., was spun through a flat membrane-producing spinnerette having suitable slit, and was caused to travel through air for a length of 180 mm. One side of the resulting flat membrane was brought into contact with a 30% aqueous DMF solution (5° C.) and the other side was brought into contact with a 10% aqueous DMF solution (20° C.), thereby to remove the solvent. The solidified flat membrane was continuously withdrawn out of the bath, washed with water, treated with hot water while being biaxially stretched at a stretching ratio of 1.1 times, dried and plasma-treated in the same way was in Example 1. The plasma treatment was applied to the surface which was brought into contact with the abovementioned 30% aqueous DMF solution of 5° C. The polyacrylonitrile reverse osmotic membrane (No. 22) thus obtained was also satisfactory in membrane properties as follows:

| Water permeation rate: | $4.3 \times 10^{-3}$ |
|---|---|
| Percent salt rejection: | 95.4% |

The measurement of the water permeation rate of this flat membrane was carried out in accordance with the above-mentioned measuring method.

(B) EXAMPLES IN THE CASE OF PROCESS II

Example 7

Twenty eight (28) parts of an acrylonitrile polymer (having a limiting viscosity [$\eta$] of 0.97 as measured in DMF at 30° C.) containing combined therewith 88% AN and 12% vinyl acetate was dissolved in 72 parts of each of the mixed solvents shown in Table 6, and the solution were deairated to prepare solutions for membrane formation. (The gellation temperatures of the respective solutions are also shown in Table 6.) Each of the solutions thus prepared, while being maintained at a temperature of 68° C., was spun through a sheath-core type spinnerette into air in which it was caused to travel for a length of 45 mm, and then it was introduced into a water bath (0% DMF solution) to remove the solvent. During this spinning process, the core portion was fed with a 10% aqueous DMF solution at 20° C. (the supply amount of the DMF solution was maintained at 1/25 of that of the membrane forming solution). The solidified hollow fiber-shaped membrane was continuously withdrawn out of the bath, washed with water, treated with hot water while being stretched 1.05 times, and dried. The thus-obtained solidified membrane was put into a vaccum vessel, and helium gas was introduced therein and was controlled to maintain a pressure of 0.2 Torr. Thereafter, an AC voltage of 3.0 kilovolts was impressed between electrodes to subject the outer surface of the hollow fiber-shaped membrane to plasma treatment for 20 minutes.

The membrane properties of the polyacrylonitrile reverse osmotic membranes thus obtained (Nos. 1-7) were evaluated. The results are shown in Table 6. The membrane properties obtained when the membrane formation temperature was maintained at 65° C. are also shown in Table 6 as No. 8.

As a comparative example (No. 9), the membrane properties obtained when the membrane formation temperature (60° C.) was lower than the gellation temperature are also shown in Table 6.

TABLE 6

| Sample no. | Mixed solvent Composition (%) DMF | FA | Others | Gellation temperature (°C.) | Temperature of solution for membrane formation (°C.) | Membrane properties Water permeation rate F | Percent salt rejection, R% | Remarks |
|---|---|---|---|---|---|---|---|---|
| 1 | 65 | 7 | — | 63 | 68 | $6.0 \times 10^{-3}$ | 96.6 | Present invention |
| 2 | 65 | — | DMSO 7 | <20 | 68 | $9.1 \times 10^{-4}$ | 20.2 | Comparative example |
| 3 | 65 | — | DMA 7 | <20 | 68 | $6.3 \times 10^{-4}$ | 20.9 | Comparative example |
| 4 | 72 | — | — | <20 | 68 | $5.0 \times 10^{-4}$ | 26.7 | Comparative example |
| 5 | 65 | 5 | DMSO 2 | 48 | 68 | $1.8 \times 10^{-2}$ | 91.4 | Present invention |
| 6 | 65 | 5 | DMA 2 | 50 | 68 | $2.2 \times 10^{-2}$ | 91.0 | Present invention |
| 7 | 65 | 5 | $CH_3OH$ 2 | 59 | 68 | $3.6 \times 10^{-3}$ | 97.0 | Present invention |
| 8 | 65 | 7 | — | 63 | 65 | $2.6 \times 10^{-2}$ | 90.1 | Present invention |
| 9 | 65 | 7 | — | 63 | 60 | $1.5 \times 10^{-2}$ | 15.3 | Comparative example |

As apparent from the results in Table 6, it is understood that the hollow fiber-shaped membranes (No. 1, Nos. 5-8) produced satisfying the conditions for the mixed solvent composition and solution temperature recommended in the present invention, are remarkably improved in their membrane properties. On the other hand, the membranes (Nos. 2, 3, and 4) produced using a solvent containing no FA, and the membrane (No. 9) whose membrane forming solution was set at a temperature lower than its gellation temperature, were not satisfactory both in water permeation rate and in salt rejection ability, so that they were not suitable for practical use. The reverse osmotic membrane of Sample No. 1 and Nos. 5-8 were excellent in resistance to water, mechanical strength and in chemical resistance. The membrane which was not subjected to plasma treatment (Sample No. 1 membrane, however without plasma treatment) had a percent salt rejection R of only 0.8%, and therefore could not be used as a reverse osmotic membrane. A hollow fiber-shaped membrane after removal from the bath was directly dried at room temperature, and plasma-treated, without being subjected to hot water treatment. The percent salt rejection R of this membrane was found to be only 10.1%, and therefore this membrane also could not be used for reverse osmosis.

EXAMPLE 8

Polyacrylonitrile reverse osmotic membranes (Nos. 10-15) were produced in the same way as in Sample No. 1 of Example 7, except that air (inert medium) was introduced into the hollow portion of the hollow fiber-shaped membrane and the travelling length in air and the coagulating temperature of the outer bath were varied as shown in Table 7. The properties of the membranes thus obtained are also shown in Table 7.

TABLE 7

| Sample no. | Production conditions Travelling length in air | Coagulating temperature of outer bath | Membrane properties Water permeation rate, F | Percent salt rejection, R% |
|---|---|---|---|---|
| 10 | 30 mm | 5° C. | $8.2 \times 10^{-3}$ | 95.3 |
| 11 | 50 | 20 | $1.3 \times 10^{-2}$ | 91.5 |
| 12 | 100 | 45 | $1.6 \times 10^{-1}$ | 47.6 |
| 13 | 150 | 30 | $1.8 \times 10^{-2}$ | 88.9 |
| 14 | 180 | 20 | $2.7 \times 10^{-2}$ | 53.7 |
| 15 | 200 | 45 | $9.4 \times 10^{-2}$ | 61.2 |

As apparent from the results in Table 7, it is understood that, by employing the solvent removal condition and suitable travelling length in air according to the present invention, reverse osmotic membranes having well-balanced membrane properties can be obtained.

EXAMPLE 9

A polyacrylonitrile reverse osmotic membrane was produced in the same way as in Sample No. 1 of Example 7, except that the membrane was caused to travel in air for a length of 35 mm and was subjected to solvent removal treatment in an outer bath of an aqueous 7% DMF solution. The membrane thus obtained represented the following satisfactory properties:

| Water permeation rate: | $7.8 \times 10^{-3}$ | $m^3/m^2$ . day . $kg/cm^2$ |
|---|---|---|
| Percent salt rejection: | 95.8% | |

EXAMPLE 10

A membrane-forming solution employed in Example 7 (corresponding to No. 6), while being maintained at a temperature of 68° C., was spun through a spinnertte having a suitable slit for use in producing flat membranes, and was caused to travel through air for a length of 40 mm. The flat membrane thus obtained was subjected to solvent removal treatment by bringing one side of said membrane into contact with a 7% aqueous DMF solution at 10° C., and the other side into contact with a water bath (0% DMF solution) at 20° C. The solidified flat membrane was continuously withdrawn out of the bath, washed with water, treated with hot water while being biaxially stretched at a stretching ratio of 1.1 times, dried and plasma-treated in the same way as in Example 7. The plasma treatment was applied to the surface which was brought into contact with the 7% aqueous DMF solution of 10° C. The polyacrylonitrile reverse osmotic membrane thus obtained was also satisfactory in membrane properties as follows:

| Water permeation rate: | $9.3 \times 10^{-3}$ | $m^3/m^2$ . day . $kg/cm^2$ |
|---|---|---|
| Percent salt rejection: | 93.9% | |

The measurement of the water permeation rate of this flat membrane was carried out in accordance with the abovementioned measuring method.

What is claimed is:

1. A process for producing a polyacrylonitrile reverse osmotic membrane which comprises the steps of dissolving an acrylonitrile polymer in formamide-containing dimethylformamide to prepare an acrylonitrile polymer solution for membrane formation; shaping the polymer solution into a membranous product of a desired form while maintaining the temperature of the polymer solution above its gellation temperature; removing the solvent from the membranous product by bringing one side of the membranous product into contact with an aqueous solution of a temperature lower than 15° C. containing at least 10 weight % of a water-soluble solvent compatible with the mixed solvent, immediately or after bringing it once into contact with an inert atmosphere, and by bringing the other side of the membranous product into contact with an inert medium or an aqueous solution of a temperature higher than 0° C. containing not more than 50 weight % of a water-soluble solvent compatible with the above-mentioned mixed solvent, immediately or after bringing it once into contact with an inert atmosphere; subjecting the thus-obtained solidified membrane to a heat treatment at a temperature between 50° and 120° C.; and then subjecting the membrane to a plasma treatment.

2. The process as claimed in claim 1 wherein the acrylonitrile polymer contains combined therewith more than 80 weight % acrylonitrile.

3. The process as claimed in claim 1 wherein the mixing ratio of formamide to dimethylformamide is from 1/99 to 28/72.

4. The process as claimed in claim 1 wherein the concentration of the acrylonitrile polymer in the solution for membrane formation is from 10 to 35 weight % based on the total weight of said solution.

5. The process as claimed in claim 1 or claim 4 wherein the concentration of the acrylonitrile polymer in the solution for membrane formation is from 20 to 32 weight % based on the total weight of said solution.

6. The process as claimed in claim 1 wherein the temperature of the solution for membrane formation is maintained by 1° to 50° C. higher than the gellation temperature of said solution.

7. The process as claimed in claim 1 wherein said other side of the membranous product is brought into contact with a medium of a temperature between 0° and 80° C. containing not more than 50 weight % of a water-soluble solvent.

8. The process as claimed in claim 1 wherein the solidified membrane is stretched at a stretching ratio of 0.8–1.5 times.

9. The process as claimed in claim 1 wherein the heat treatment temperature is between 80° and 100° C.

10. A process for producing a polyacrylonitrile reverse osmotic membrane which comprises the steps of dissolving an acrylonitrile polymer in formamide-containing dimethylformamide to prepare an acrylonitrile polymer solution for membrane formation; shaping the polymer solution into a membranous product of a desired form while maintaining the temperature of the polymer solution above its gellation temperature; removing the solvent from the membranous product by bringing one side of the membranous product into contact with an inert atmosphere followed by bringing it into contact with an aqueous solution of a temperature lower than 40° C. containing not more than 10 weight % of a water-soluble solvent compatible with said mixed solvent, and by bringing the other side of the membranous product into contact with an inert medium or an aqueous solution of a temperature higher than 0° C. containing not more than 50 weight % of a water-soluble solvent compatible with said mixed solvent, immediately or after bringing it once into contact with an inert atmosphere; subjecting the thus-obtained solidified membrane to a heat treatment at a temperature between 50° and 120° C.; and then subjecting the membrane to a plasma treatment.

11. The process as claimed in claim 10 wherein the acrylonitrile polymer contains combined therewith more than 80 weight % acrylonitrile.

12. The process as claimed in claim 10 wherein the mixing ratio of formamide to dimethylformamide is from 1/99 to 28/72.

13. The process as claimed in claim 10 wherein the concentration of the acrylonitrile polymer in the solution for membrane formation is from 15 to 40 weight % based on the total weight of said solution.

14. The process as claimed in claim 10 or claim 13 wherein the concentration of the acrylonitrile polymer in the solution for membrane formation is from 20 to 35 weight % based on the total weight of said solution.

15. The process as claimed in claim 10 wherein the temperature of the solution for membrane formation is maintained by 1° to 50° C. higher than the gellation temperature of said solution.

16. The process as claimed in claim 10 wherein said other side of the membranous product is brought into contact with a medium of a temperature between 0° and 80° C. containing not more than 50 weight % of a water-soluble solvent.

17. The process as claimed in claim 10 wherein the solidified membrane is stretched at a stretching ratio of 0.8–1.5 times.

18. The process as claimed in claim 10 wherein the heat treatment temperature is between 80° and 100° C.

* * * * *